United States Patent
Reichert et al.

(10) Patent No.: US 6,692,836 B2
(45) Date of Patent: Feb. 17, 2004

(54) COMPOSITE MATERIAL

(75) Inventors: Werner Reichert, Wuppertal (DE); Klaus Ganz, Wuppertal (DE)

(73) Assignee: Alanod Aluminium-Veredlung GmbH & Co. KG, Ennepetal (DE)

( * ) Notice: Subject to any disclaimer, the term of this patent is extended or adjusted under 35 U.S.C. 154(b) by 28 days.

(21) Appl. No.: 10/029,463

(22) Filed: Dec. 20, 2001

(65) Prior Publication Data

US 2002/0076564 A1 Jun. 20, 2002

(30) Foreign Application Priority Data

Dec. 20, 2000 (DE) ................................ 200 21 660 U

(51) Int. Cl.$^7$ ................................................ B32B 9/00
(52) U.S. Cl. ................... 428/469; 428/472.2; 428/689; 428/699; 428/701; 428/702
(58) Field of Search ................. 428/457, 469, 428/472.2, 688, 689, 699, 701, 702, 912.2, 924; 359/530, 838; 362/476, 516, 341, 351, 806

(56) References Cited

U.S. PATENT DOCUMENTS

| | | |
|---|---|---|
| 5,527,562 A | 6/1996 | Balaba et al. |
| 5,663,001 A | 9/1997 | Textor et al. |
| 5,904,989 A * | 5/1999 | Hanggi et al. ............. 428/457 |
| 5,919,561 A | 7/1999 | Fuchs et al. |

FOREIGN PATENT DOCUMENTS

| | | |
|---|---|---|
| DE | 196 39 059 | 10/1997 |
| EP | 0 918 234 | 5/1999 |

* cited by examiner

*Primary Examiner*—Deborah Jones
*Assistant Examiner*—G. A. Blackwell-Rudasill
(74) *Attorney, Agent, or Firm*—Brinks Hofer Gilson & Lione

(57) ABSTRACT

A composite material having an aluminum substrate, an intermediate layer located on one side of the substrate, and an optically active multilayer system applied to the intermediate layer. The multilayer system includes three layers. The two upper layers are dielectric and/or oxide layers and the bottom layer is a metallic layer applied to the intermediate layer. In order to controllably and selectively set the absorptivity and reflectivity in various wavelength regions, the intention also being to ensure good processability, in particular deformability, a high thermal conductivity and high long-term thermal and chemical stability of the material, the top layer is a dielectric layer, preferably an oxide, fluoride or nitride layer of chemical composition $MeO_z$, $MeF_r$, $MeN_s$, with a refractive index n<1.8. The middle layer is a chromium oxide layer of chemical composition $CrO_x$. The bottom layer of gold, silver, copper, chromium, aluminum and/or molybdenum. The indices x, z, r and s indicate a stoichiometric or non-stoichiometric ratio in the oxides, fluorides or nitrides.

39 Claims, 1 Drawing Sheet

COMPOSITE MATERIAL

BACKGROUND OF THE INVENTION

The present invention relates to a composite material having a substrate, which consists of aluminum, having an intermediate layer, which is located on the substrate on one side, and having an optically active multilayer system, which is applied to the intermediate layer and comprises three layers, the two upper layers being dielectric and/or oxide layers and the bottom layer being a metallic layer which has been applied to the intermediate layer.

A composite material of this general type, as surface-treated aluminum strip which goes by the name of MIRO®, is in widespread use for illumination engineering, daylight systems and decorative applications. The surface treatment serves to better protect the sensitive aluminum surface and to increase the light reflectivity. The surface-treatment operation comprises two different processes, which can both be operated continuously, specifically the production of the intermediate layer in a wet-chemical process, which is referred to overall as anodizing and comprises electrolytic brightening and anodic oxidation, and the application of the optically active multilayer system in vacuo. The two upper layers are generally dielectric layers; the use of oxide layers, such as for example aluminum oxide or titanium oxide as the top layer, silicon dioxide as the middle layer, represents a preferred specific case. In connection with details of the known MIRO® process, reference is made, by way of example, to "elektrowärme international" 53 (1995) B4—November, pp. B215–B223.

In general, when radiation impinges on an object it is split into a reflected fraction, an absorbed fraction and a transmitted fraction, which are determined by the reflectivity (reflectance), the absorptivity (absorptance) and the transmissivity (transmittance) of the object. Reflectance, absorptance and transmittance are optical properties which, depending on the wavelength of incident radiation (e.g. in the ultraviolet region, in the region of visible light, in the infrared region and in the region of thermal radiation), can adopt different values for the same material. Kirchhoff's law, according to which the absorptivity, in each case at a defined temperature and wavelength, has a constant ratio to the emittance, is known to apply to the absorptance. Therefore, Wien's displacement law and Planck's law as well as the Stefan-Boltzmann law are of importance for the absorptance, describing defined relationships between radiation intensity, spectral distribution density, wavelength and temperature of a black body. Calculations should take account of the fact that the black body per se does not exist, and real substances each deviate in a characteristic way from the ideal distribution.

In the known composite material, in particular the high reflectance in the visible light region plays a role; this reflectance is expressed by a total light reflectivity, determined in accordance with DIN 5036, Part 3, with peak values of up to 95%. Moreover, in the known material, which is preferably supplied as a semi-finished product, its excellent processability, in particular its deformability, should be emphasized.

For certain applications, it may also be the case that in one wavelength region of the incident radiation the highest possible reflectivity is required, while in other regions the lowest possible reflectivity but a higher absorptivity are required. This is the case, for example, in the field of solar collectors, in which a maximum absorptivity is required in the solar wavelength region (approximately 300 to approximately 2500 nm) and a maximum reflectivity is required in the thermal radiation region (over approximately 2500 nm). By way of example, absorbers for flat collectors in which a composite material which satisfies these requirements is used are known under the name Tinox. This material comprises a substrate made from a copper strip, a layer of titanium oxynitride applied to the substrate and a covering layer of silicon dioxide.

BRIEF SUMMARY OF THE INVENTION

The present invention is based on the object of providing a composite material of the type described in the introduction which enables the absorptivity and reflectivity to be set in a controlled and selective manner in different wavelength regions. Furthermore, the composite material is also to be distinguished by good processability, in particular deformability, high thermal conductivity and high long-term thermal and chemical stability.

According to the invention, this is achieved by the fact that the top layer of the multilayer system is a dielectric layer, preferably an oxide, fluoride or nitride layer of chemical composition $MeO_z$, $MeF_r$, $MeN_s$, with a refractive index n<1.8. The middle layer of the multilayer system is a chromium oxide layer of chemical composition $CrO_x$. The bottom layer of the multilayer system consists of gold, silver, copper, chromium, aluminum, nickel and/or molybdenum. In the above formulations, Me is defined as a metal and indices x, z, r and s indicate a stoichiometric or non-stoichiometric ratio in the oxides, fluorides or nitrides.

The optical multilayer system according to the invention can be applied, advantageously, without the need for environmentally hazardous, in some cases toxic, salt solutions during production. For example, the metallic layer of the optical multilayer system may be a sputtered layer or a layer which is produced by vaporization, in particular by electron bombardment or from thermal sources. The two upper layers of the optical multilayer system may likewise be sputtered layers, in particular layers produced by reactive sputtering, CVD or PECVD layers or layers produced by vaporization, in particular by electron bombardment or from thermal sources. As such, the entire optical multilayer system comprises layers which are applied in vacuum order, in particular in a continuous process.

The top layer may alternatively be a silicon oxide layer of chemical composition $SiO_y$, the index y once again indicating a stoichiometric or non-stoichiometric ratio in the oxide composition.

The said processes advantageously also not only enable the chemical composition of the top layer and the chemical composition $CrO_x$ of the chromium oxide layer, with regard to the indices x, y, z, r and s, to be set at defined, discrete values but also allow a stoichiometric or non-stoichiometric ratio between the oxidized substance and the oxygen to be varied continuously within defined limits. In this way it is possible, for example, to specifically set, by way of example, the refractive index of the reflection-reducing top layer, which is also responsible for increasing the mechanical load-bearing capacity (DIN 58196, part 5), and the absorptivity of the chromium oxide layer, the absorptance decreasing as the value of the index x rises.

According to the invention, it is in this way possible to set a total light reflectivity, determined in accordance with DIN 5036, part 3, on the side of the optical multilayer system to a preferred level of less than 5%; in addition to a high resistance to ageing, it is also possible to ensure a high thermal stability, in such a manner that, under a thermal load of 430° C./100 hours, only changes of less than 7%, preferably of less than 4%, of the reflectivity occur on the side of the optical multilayer system. Moreover, in the event of a thermal load of this nature, there is advantageously also no evolution of gases.

The composite material according to the invention, on account of its synergistically acting combination of properties

- of the substrate layer, for example its excellent deformability, by means of which it withstands without problems, stresses produced of the further processors during the shaping processes which are to be performed, for example its high thermal conductivity and the capacity for a surface patterning which in the solar wavelength region additionally promotes absorption and is then followed by the other layers in relief, and moreover with a reflectance in the thermal radiation region which reinforces the action of the metallic layer of the optical three-layer system;
- of the intermediate layer, which firstly ensures mechanical and corrosion-inhibiting protection for the substrate and secondly ensures high adhesion for the optical multilayer system;
- of the metallic layer which, on account of its constituents, which have a high reflectance and therefore a low emission in the thermal radiation region, takes account of the fact that, according to the Lambert-Bouguer law, the radiation characteristic is absorbed exponentially as the penetration depth grows, and for most inorganic substances is available even at a very low depth (less than approximately 1 $\mu$m) as thermal energy which can be stored;
- of the chromium oxide layer, with its high selectivity of the absorptivity (peak values over 90% in the solar region, minimum values below 15% in the wavelength region>approx. 2500 nm) and its capacity for modification (index x) which has already been explained, and
- of the top, in particular silicon oxide, layer, the advantages of which have to some extent already been pointed out above and which, in addition to its antireflective action, also has a high transmittance and, as a result, increases the proportion of the radiation values in the solar region which can be absorbed by the chromium oxide layer;

is eminently suitable for absorbers for solar collectors and for other applications, for example as light absorbers used in the construction of motor vehicle headlights or other illumination devices. For example, using the composite material according to the invention, it is possible not only to produce low-temperature collectors with an operating temperature of up to 100° C., but also to produce high-temperature collectors. Steady temperatures of over 250° C. are possible; this term is in each case to be understood as meaning the maximum theoretically possible temperature of use at which the material is in thermal equilibrium with the environment.

Further advantageous embodiments of the invention are contained in the subclaims and in the detailed description which follows.

BRIEF DESCRIPTION OF THE DRAWINGS

The invention is explained in more detail with reference to an exemplary embodiment illustrated by the appended drawing, in which.

DETAILED DESCRIPTION OF THE INVENTION

Figure 1:
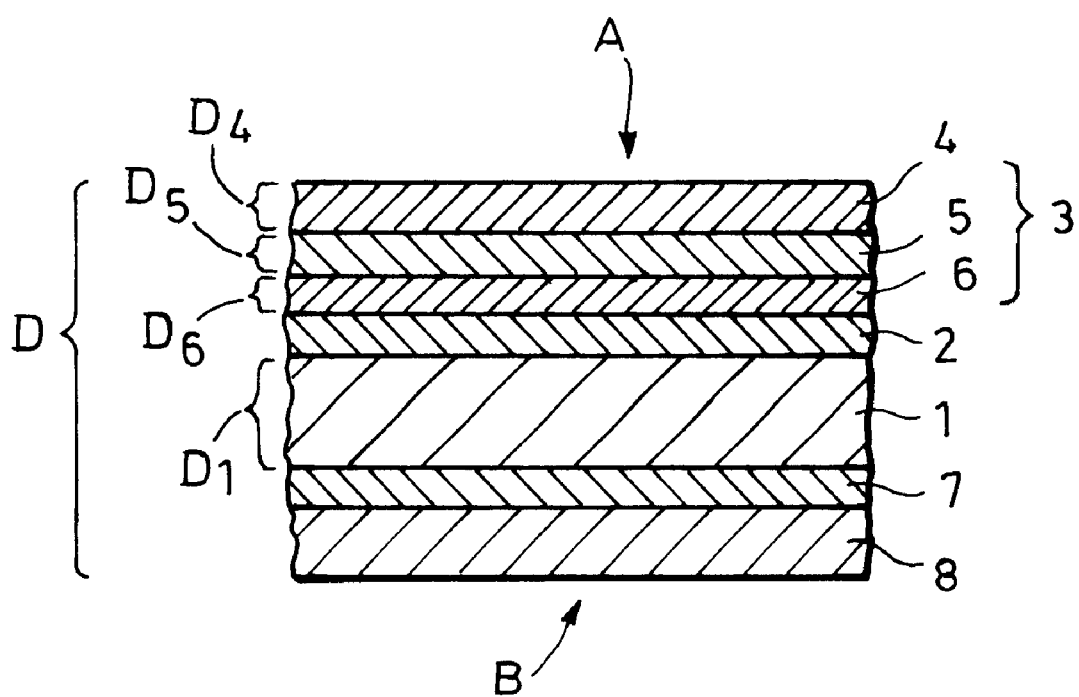
FIG. 1 is a partial cross-sectional illustration through a composite material according to the invention.

The embodiment described relates to a composite material according to the invention with a high selectivity in terms of the absorptivity and reflectivity in the solar wavelength region and in the thermal radiation region.

The composite material comprises a substrate 1 which is in strip form and is capable of undergoing deformation and consists of aluminum, an intermediate layer 2, which has been applied to the substrate 1 on one side A, and an optically active multilayer system 3 which has been applied to the intermediate layer 2.

A total light reflectivity, determined in accordance with DIN 5036, Part 3, on the side A of the optical multilayer system 3 is less than 5%.

The composite material can preferably be in the form of a coil with a width of up to 1600 mm, preferably of 1250 mm, and with a thickness D of approximately 0.1 to 1.5 mm, preferably of approximately 0.2 to 0.8 mm. The substrate 1 may preferably have a thickness $D_1$ of approximately 0.1 to 0.7 mm.

The aluminum of the substrate 1 may in particular be more than 99.0% pure, which promotes its thermal conductivity.

The intermediate layer 2 consists of anodically oxidized or electrolytically brightened and anodically oxidized aluminum which is formed from the substrate material.

The multilayer system 3 in turn comprises three individual layers 4, 5, 6, the two upper layers 4, 5 being oxide layers and the bottom layer 6 being a metallic layer which is applied to the intermediate layer 2. The top layer 4 of the optical multilayer system 3 is a silicon oxide layer of chemical composition $SiO_y$. The middle layer 5 is a chromium oxide layer of chemical composition $CrO_x$, and the bottom layer 6 consists of gold, silver, copper, chromium, aluminum and/or molybdenum.

The indices x, y indicate a stoichiometric or non-stoichiometric ratio of the oxidized substance to the oxygen in the oxides. The stoichiometric or non-stoichiometric ratio x may preferably lie in the range 0<x<3, while the stoichiometric or non-stoichiometric ratio y may adopt values in the range $1 \leq y \leq 2$.

The fact that the two upper layers 4, 5 of the optical multilayer system 3 may be sputtered layers, in particular layers produced by reactive sputtering, CVD or PECVD layers or layers produced by vaporization, in particular by electron bombardment or from thermal sources, means that it is possible to adjust the ratios x, y continuously (i.e. to set them to non-stoichiometric values of the indices), with the result that the layer properties can in each case be varied.

The top layer 4 of the optical multilayer system 3 may advantageously have a thickness $D_4$ of more than 3 nm. At this thickness $D_4$, the layer is already sufficiently efficient, yet the outlay on time, material and energy is low. An upper limit for the layer thickness $D_4$, in view of these aspects, is approximately 500 nm. An optimum value for the middle layer 5 of the optical multilayer system 3, in view of the abovementioned aspects, is a minimum thickness $D_5$ of more than 10 nm and a maximum thickness $D_5$ of approximately 1 $\mu$m. The corresponding value for the bottom layer 6 is a thickness $D_6$ of at least 3 nm, at most approximately 500 nm.

With a view to achieving high efficiency, the bottom layer 6 of the optical multilayer system 3 should preferably be more than 99.5% pure. As has already been mentioned, the layer may be a sputtered layer or a layer which is produced by vaporization, in particular by electron bombardment or from thermal sources, so that the entire optical multilayer system 3 advantageously comprises layers 4, 5, 6 which are applied in vacuum order in a continuous process.

A lower layer 7, which—like the intermediate layer 2—consists of anodically oxidized or electrolytically brightened and anodically oxidized aluminum, is applied to that side B of the strip-like substrate 1 which is remote from the optical multilayer system 3. The intermediate layer 2 and the lower layer 7 may advantageously be produced simultaneously by wet-chemical means, in which case the pores in the aluminum oxide layer can be as far as possible closed off by hot-sealing during the final phase of the wet-chemical process sequence, resulting in a surface with long-term stability. Therefore, the lower layer 7—like the intermediate layer 2—offers mechanical and corrosion-inhibiting protection to the substrate 1.

A total light reflectivity, determined in accordance with DIN 5036, Part 3, on the side B which is remote from the optical multilayer system 3 may preferably be at least 84%.

According to the invention, it is possible in particular to design the layer structure in such a manner that the total light reflectivity, determined in accordance with DIN 5036, Part 3, on the side A of the optical multilayer system 3 and/or on the side B which is remote from the optical multilayer system 3, under a thermal load of 430° C./100 hours, undergoes changes of less than 7%, preferably of less than 4%.

The present invention is not restricted to the exemplary embodiment illustrated, but rather comprises all means and measures which have a similar effect within the scope of the invention. For example, it is also possible for the bottom layer 6 of the optical multilayer system 3 to comprise a plurality of partial layers of gold, silver, copper, chromium, aluminum and/or molybdenum arranged above one another. As has already been mentioned, the top layer may alternatively also consist of fluorides or nitrides.

Furthermore, the person skilled in the art can supplement the invention with additional advantageous measures without departing from the scope of the invention. For example, it is possible—as is also illustrated in the drawing—for a decorative layer 8 to be additionally applied to the side B which is remote from the optical multilayer system 3, in particular to the lower layer 7. This decorative layer 8 may, for example, be a mirror coating which is metallic or consists of titanium nitride or other suitable materials which can be used to impart not only a gloss but also a specific colour.

Furthermore, the invention is not restricted to the combination of features defined in claim 1, but rather may also be defined by any other desired combination of specific features of all the individual features disclosed. This means that in principle virtually any individual feature of claim 1 can be omitted or replaced by at least one individual feature disclosed elsewhere in the application. In this respect, claim 1 is only to be understood as an initial attempt at putting an invention into words.

What is claimed is:

1. Composite material comprising a substrate of aluminum having an intermediate layer located on one side, and having an optically active multilayer system applied to the intermediate layer, the multilayer system having three layers including a top layer, a middle layer and a bottom layer, the bottom layer being a metallic layer applied to the intermediate layer, the top layer being a dielectric layer with a refractive index n<1.8, the middle layer being a light absorptive layer having chromium as one of its constituent elements, and the bottom layer being selected from one of the group consisting of gold, silver, copper, chromium, aluminum and molybdenum.

2. Composite material according to claim 1, wherein the top layer is a silicon oxide layer of chemical composition $SiO_y$, the index y indicating a stoichiometric or non-stoichiometric ratio.

3. Composite material according to claim 1, wherein the top layer is of a chemical composition selected from the group consisting of $MeO_2$, $MeF_r$ and $MeN_s$, where Me is a metal and the indices z, r and s indicating a stoichiometric or non-stoichiometric ratio.

4. Composite material according to claim 1, wherein the intermediate layer is of anodically oxidized aluminum.

5. Composite material according to claim 4, wherein the anodically oxidized aluminum is electrolytically brightened.

6. Composite material comprising a substrate of aluminum having an intermediate layer located on one side, and having an optically active multilayer system applied to the intermediate layer, the multilayer system having three layers including a top layer, a middle layer and a bottom layer, the bottom layer being a metallic layer applied to the intermediate layer, the top layer being a dielectric layer with a refractive index n<1.8, the middle layer being a chromium oxide layer of chemical composition $CrO_x$, and the bottom layer being selected from one of the group consisting of gold, silver, copper, chromium, aluminum and molybdenum, the index x indicating a stoichiometric or non-stoichiometric ratio, a lower layer applied to the substrate on a side opposite from the optical multilayer system, the lower layer being anodically oxidized aluminum.

7. Composite material comprising a substrate of aluminum having an intermediate layer located on one side, and having an optically active multilayer system applied to the intermediate layer, the multilayer system having three layers including a top layer, a middle layer and a bottom layer, the bottom layer being a metallic layer applied to the intermediate layer, the top layer being a dielectric layer with a refractive index n<1.8, the middle layer being a chromium oxide layer of chemical composition $CrO_x$, and the bottom layer being selected from one of the group consisting of gold, silver, copper, chromium, aluminum and molybdenum, the index x indicating a stoichiometric or non-stoichiometric ratio, a decorative layer applied to the side of a substrate opposite of the optical multilayer system.

8. Composite material according to claim 6, wherein the anodically oxidized aluminum is electrolytically brightened.

9. Composite material according to claim 1, wherein the middle layer is chromium oxide having the chemical composition of $CrO_x$, the stoichiometric or non-stoichiometric ratio x being in the range 0<x<3.

10. Composite material according to claim 2, wherein the stoichiometric or non-stoichiometric ratio y lies in the range $1 \leq y \leq 2$.

11. Composite material according to claim 1, wherein the bottom layer is a plurality of partial layers of at least two selected from the group consisting of gold, silver, copper, chromium, aluminum and molybdenum, the partial layers being arranged above one another.

12. Composite material according to claim 1, wherein the two upper layers are sputtered layers.

13. Composite material according to claim 12, wherein the sputtered layers are layers produced by reactive sputtering.

14. Composite material according to claim 1, wherein the upper layers are produced by vaporization.

15. Composite material according to claim 1, wherein the upper layers are CVD layers.

16. Composite material according to claim 1, wherein the upper layers are PECVD layers.

17. Composite material according to claim 1, wherein the metallic layer is a sputtered layer.

18. Composite material according to claim 1, wherein the metallic layer is a layer produced by vaporization.

19. Composite material according to claim 1, wherein the metallic layer is a layer produced by electron bombardment.

20. Composite material according to claim 1, wherein the metallic layer is a layer produced from thermal sources.

21. Composite material according to claim 1, wherein the three layers of the optical multilayer system are applied in vacuum order in a continuous process.

22. Composite material according to claim 1, wherein the top layer has a thickness in the range of 3 nm to 500 nm.

23. Composite material according to claim 1, wherein the middle layer has a thickness in the range of 10 nm to 1 µm.

24. Composite material according to claim 1, wherein the bottom layer has a thickness in the range of 3 nm to 500 nm.

25. Composite material according to claim 1, wherein total light reflectivity of the optical multilayer system is less than 5%.

26. Composite material according to claim 1, wherein total light reflectivity on a side of the substrate opposite of the optical multilayer system is at least 84%.

27. Composite material according to claim 1, wherein total light reflectivity of the optical multilayer system under a thermal load of 430° C./100 hours, undergoes a change of less than 7%.

28. Composite material according to claim 1, wherein total light reflectivity of the optical multilayer system under a thermal load of 430° C./100 hours, undergoes a change of less than 4%.

29. Composite material according to claim 1, wherein total light reflectivity on a side of the substrate opposite of the optical multilayer system under a thermal load of 430° C./100 hours, undergoes a change of less than 7%.

30. Composite material according to claim 1, wherein total light reflectivity on a side of the substrate opposite of the optical multilayer system under a thermal load of 430° C./100 hours, undergoes a change of less than 4%.

31. Composite material according to claim 1, wherein the aluminum of the substrate is at least 99.0% pure.

32. Composite material according to claim 1, wherein the bottom layer is more than 99.5% pure.

33. Composite material according to claim 1, wherein the material is provided as a coil.

34. Composite material according to claim 33, wherein the coil has a width of less than 1600 mm and a thickness in the range of 0.1 to 1.5 mm.

35. Composite material according to claim 34, wherein the width is about 1250 mm.

36. Composite material according to claim 34, wherein the thickness is in the range of 0.2 to 0.8 mm.

37. Composite material according to claim 7, wherein the decorative layer is a mirror coating.

38. Composite material according to claim 6, further comprising a decorative layer applied to the lower layer on the side of the substrate opposite of the optical multiplayer system.

39. Composite material according to claim 38, wherein the decorative layer is a mirror coating.

* * * * *